July 18, 1950        R. E. MARBURY        2,516,010
DISCHARGE INDICATOR FOR CAPACITORS
Filed July 17, 1948
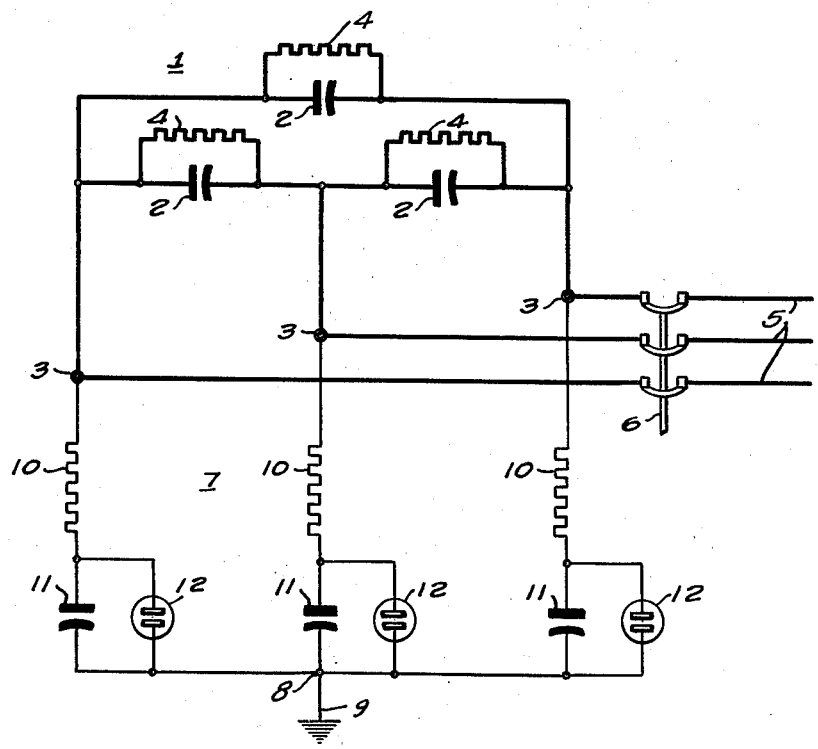
WITNESSES:
INVENTOR
Ralph E. Marbury.
BY
ATTORNEY Patented July 18, 1950

2,516,010

UNITED STATES PATENT OFFICE 2,516,010

DISCHARGE INDICATOR FOR CAPACITORS

Ralph E. Marbury, Pittsburgh, Pa., assignor to Westinghouse Electric Corporation, East Pittsburgh, Pa., a corporation of Pennsylvania Application July 17, 1948, Serial No. 39,292

6 Claims. (Cl. 177—311)

The present invention relates to discharge indicators for capacitors, and more particularly to a device which is capable of indicating the progress of the discharge of a capacitor, or a capacitor bank.

Capacitors are frequently connected to electrical distribution or transmission circuits for the purpose of correcting the power factor, and banks of capacitors are often used which are capable of storing relatively large amounts of energy. When such a capacitor bank is disconnected from the line, the capacitors are fully charged, and the voltage across the terminals of the capacitors, or of the capacitor bank, is usually high enough to be dangerous to life. Standard capacitors, of the type used for power factor correction, have a discharge resistor built into the capacitor which is capable of discharging the capacitor to a voltage of fifty volts or less in not more than five minutes after the capacitor is disconnected from the line. The operators, or users, of such capacitors are instructed not to touch the capacitor for at least five minutes after it is disconnected from the line, since in this time, the discharge resistor will sufficiently discharge the capacitor to decrease its voltage to a value which is low enough to permit the capacitor terminals to be safely short-circuited and grounded. The capacitor should also be given sufficient time to be discharged before it is reconnected to the line, in order to avoid transient voltage surges. There has been no readily available means, however, for indicating when the capacitor is sufficiently discharged for safety, or for reconnection to the line, and it has been necessary to rely on the lapse of the specified time as the only indication of the discharge of the capacitor.

The principal object of the present invention is to provide a discharge indicator which will positively indicate when a capacitor, or capacitor bank, is sufficiently discharged to be safely short-circuited and handled.

Another object of the invention is to provide a discharge indicator for capacitors which positively shows that the discharge indicator itself is operating properly, so that its indication can be safely relied on.

A further object of the invention is to provide a discharge indicator for capacitors which shows the progress of the discharge from the time the capacitor is disconnected from the line until the voltage has decreased to a safe value, so that the operator will have the maximum assurance that it is safe to touch the capacitor.

Other objects and advantages of the invention will be apparent from the following detailed description, taken in connection with the accompanying drawing, the single figure of which is a schematic diagram showing a preferred embodiment of the invention.

The discharge indicator of the present invention is shown in the drawing applied to a three-phase capacitor bank 1, which is shown as comprising three capacitor units 2 connected in delta to terminals 3. The capacitor units 2 may be of any suitable type, and are shown as being provided with discharge resistors 4 connected across their terminals, the discharge resistors 4 being built into the capacitor units themselves in the usual construction. It will be understood that although the capacitor bank 1 has been shown as consisting of three individual units, it might equally well be a single three-phase unit, or a larger bank consisting of any suitable number of capacitors 2 connected in any desired parallel or series-parallel connection in each phase. The terminals 3 of the capacitor bank 1 are connected to a three-phase line 5 by means of a switch or circuit breaker 6, which may be controlled manually or automatically in any desired manner.

The discharge indicator 7, to which the present invention is directed, is shown as a three-phase device, for use with the three-phase capacitor bank 1. The discharge indicator 7 is connected to the terminals 3 of the capacitor bank 1, and is shown as being star-connected, with the neutral point 8 preferably grounded at 9. Each phase of the three-phase discharge indicator 7 consists of a resistor 10 of relatively high resistance connected in series with a relatively small capacitor 11. A gaseous discharge device 12 is connected across the capacitor 11. The discharge device 12 may be any suitable type of gaseous discharge device, such as a small neon tube, which will break down and give a visual indication when the voltage across the capacitor 11 exceeds the breakdown voltage of the discharge device 12.

As indicated above, the resistors 10 have relatively high resistance, while the capacitors 11 have relatively low capacitance. For example, suitable values for the resistors 10 and capacitors 11 may be of the order of 60 megohms and between 0.0025 and 0.01 microfarad, respectively, although it is to be understood that these values are merely illustrative, and that the exact values used are not critical, the only requirement being that the relation of the impedances of the resistors 10 and capacitors 11 shall be such that, when the discharge indicator is energized by alternating current, substantially all the voltage will appear across the resistors.

In operation, when the switch 6 is closed and the capacitor bank 1 is connected to the line 5, the discharge indicator 7 is energized by alternating current, and because of the relative impedances of the resistors 10 and capacitors 11, substantially all of the voltage in each phase appears across the resistors 10 and there is substantially no voltage, or only a negligibly small voltage, across the capacitors 11. The discharge tubes 12, therefore, will not break down and will remain dark. These tubes thus have a long life, since they are not energized normally and operate only during the relatively short times when the capacitor bank 1 is discharging.

When the switch 6 is opened to disconnect the capacitor bank 1 from the line 5, the capacitors 2 are fully charged, so that a high direct-current voltage exists between the terminals 3 of the capacitor bank. Since the discharge indicator 7 is connected to the terminals 3, this direct-current voltage is applied across the phases of the discharge indicator, and appears entirely across the capacitors 11. The voltage of the capacitors 2 is relatively high immediately after the capacitor bank is disconnected, and the discharge tubes 12 will break down and start discharging, giving a visual signal and indicating to the operator that the discharge indicator is operating properly.

The charge on the capacitors 2 beings to be dissipated in the resistors 4 as soon as the switch 6 is opened, and thus the voltage between the terminals 3 begins to decrease. When it has decreased to a value of the order of 500 volts, for example, the voltage across the capacitors 11 becomes too low to sustain the discharge in the tubes 12, and they cease discharging. A charge thereupon builds up on the capacitors 11, which have previously been short-circuited by the tubes 12, and the voltage across these capacitors accordingly increases until the tubes 12 again break down. As soon as the charge on the capacitors 11 is dissipated through the tubes 12, they will go out and the charge on the capacitors 11 again starts building up. Thus, the tubes 12 alternately light up and go out, giving repeated flashes. The voltage between the terminals 3 continues to decrease as the capacitors 2 become discharged, and the time required to build up a charge on the capacitors 11 after each operation of the tubes 12 therefore increases, so that the frequency of the flashes of the tubes 12 decreases as the charge of the capacitors 2 is dissipated.

When the voltage between the terminals 3 has dropped to about 100 volts, the tubes 12 will stop flashing, since this voltage is insufficient to build up enough charge on the capacitors 11 to cause the tubes 12 to break down. Thus, the tubes 12 cease to flash, and this indicates that the capacitor bank 1 has been discharged to a sufficiently low voltage to make it safe to short-circuit and ground the terminals 3, so that the capacitors 2 can be touched without danger. It will be seen that the discharge indicator 7 makes it possible to observe the progress of the discharge, since the tubes 12 initially glow continuously, and then, as the discharge of the capacitors 2 progresses, the tubes 12 begin to flash, and flash more and more slowly as the capacitors 2 discharge until they finally cease to flash at all, which indicates that the capacitor bank 1 is sufficiently discharged for safety.

It will be apparent, therefore, that a discharge indicator has been provided which gives a positive and reliable indication of the discharge of a capacitor to which it is connected, and which also positively shows that the discharge indicator itself is operating properly. The discharge indicator has been shown as a three-phase device, applied to a three-phase capacitor bank, but it will be understood that a single phase of the discharge indicator can be used in the same manner with a single-phase capacitor bank, or with an individual single-phase capacitor unit. It will also be obvious that various modifications of the device are possible. Thus, the resistors 10 might be replaced by other suitable impedance devices, so long as the relation of the impedances of these devices to the impedances of the capacitors 11 is such that substantially no voltage appears across the capacitors 11 when the device is energized by alternating current. Other variations and modifications may be made within the scope of the invention, and it is to be understood, therefore, that the invention is not limited to the specific arrangement shown for the purpose of illustration, but in its broadest aspects it includes all equivalent embodiments and modifications which come within the scope of the appended claims.

I claim as my invention:

1. A discharge indicator for a capacitor, said discharge indicator comprising an impedance device and a capacitor connected in series, the relative impedances of said impedance device and capacitor being such that substantially no voltage appears across the capacitor when the discharge indicator is energized by alternating current, a voltage-responsive discharge device connected across the capacitor and adapted to give a visual indication whenever the voltage across the capacitor exceeds a predetermined value, and means for connecting the discharge indicator to be responsive to the voltage of a capacitor the discharge of which is to be observed.

2. A discharge indicator for a capacitor, said discharge indicator comprising an impedance device and a capacitor connected in series, the relative impedances of said impedance device and capacitor being such that substantially no voltage appears across the capacitor when the discharge indicator is energized by alternating current, a gaseous discharge device connected across said capacitor, said discharge device being of a type which breaks down and gives a visual indication when the voltage across the capacitor exceeds a predetermined value, and means for connecting the discharge indicator to be responsive to the voltage of a capacitor the discharge of which is to be observed.

3. A discharge indicator for a capacitor, said discharge indicator comprising a resistor and a capacitor connected in series, the relative impedances of said resistor and capacitor being such that substantially no voltage appears across the capacitor when the discharge indicator is energized by alternating current, a voltage-responsive discharge device connected across the capacitor and adapted to give a visual indication whenever the voltage across the capacitor exceeds a predetermined value, and means for connecting the discharge indicator to be responsive to the voltage of a capacitor the discharge of which is to be observed.

4. A discharge indicator for a capacitor, said discharge indicator comprising a resistor and a capacitor connected in series, the relative impedances of said resistor and capacitor being such that substantially no voltage appears across the capacitor when the discharge indicator is energized by alternating current, a gaseous discharge device connected across said capacitor, said discharge device being of a type which breaks down and gives a visual indication when the voltage across the capacitor exceeds a predetermined value, and means for connecting the discharge indicator to be responsive to the voltage of a capacitor the discharge of which is to be observed.

5. A discharge indicator for a three-phase capacitor assembly, said discharge indicator comprising a three-phase circuit adapted to be connected to the terminals of said capacitor assembly, each phase of said three-phase circuit comprising an impedance device and a capacitor connected in series, and a gaseous discharge device connected across the capacitor, said discharge device being adapted to give a visual indication whenever the voltage across the capacitor exceeds a predetermined value, the relative impedances of said impedance device and capacitor being such that substantially no voltage appears across the capacitor when the discharge indicator is energized by alternating current.

6. A discharge indicator for a three-phase capacitor assembly, said discharge indicator comprising a three-phase circuit adapted to be connected to the terminals of said capacitor assembly, each phase of said three-phase circuit comprising a resistor and a capacitor connected in series, and a gaseous discharge device connected across the capacitor, said discharge device being adapted to give a visual indication whenever the voltage across the capacitor exceeds a predetermined value, the relative impedances of said impedance device and capacitor being such that substantially no voltage appears across the capacitor when the discharge indicator is energized by alternating current.

RALPH E. MARBURY.

REFERENCES CITED

The following references are of record in the file of this patent:

UNITED STATES PATENTS

| Number | Name | Date |
| --- | --- | --- |
| 2,168,805 | Pelikan | Aug. 8, 1939 |
| 2,176,742 | La Pierre | Oct. 17, 1939 |
| 2,309,174 | Dodd | Jan. 26, 1943 |